(12) United States Patent
Blauvelt

(10) Patent No.: US 8,190,035 B2
(45) Date of Patent: May 29, 2012

(54) BURST MODE LINEAR OPTICAL RECEIVERS

(75) Inventor: Henry A. Blauvelt, San Marino, CA (US)

(73) Assignee: Emcore Corporation, Albuquerque, NM (US)

( * ) Notice: Subject to any disclaimer, the term of this patent is extended or adjusted under 35 U.S.C. 154(b) by 240 days.

(21) Appl. No.: 12/616,594

(22) Filed: Nov. 11, 2009

(65) Prior Publication Data

US 2011/0110672 A1    May 12, 2011

(51) Int. Cl.
*H04B 10/06* (2006.01)
(52) U.S. Cl. ........ 398/202; 398/208; 398/209; 398/135; 398/136; 398/137; 250/214 A; 250/214 AG; 330/59; 330/308
(58) Field of Classification Search ................. 398/202, 398/208, 209, 213, 214, 135, 136, 137, 138, 398/139, 158, 159, 66, 67, 68, 70, 71, 72, 398/98, 99, 100, 128, 130; 250/214 A, 214 R, 214 AG, 214 LA; 330/59, 308
See application file for complete search history.

(56) References Cited

U.S. PATENT DOCUMENTS

| | | | |
|---|---|---|---|
| 5,477,370 A * | 12/1995 | Little et al. | 398/202 |
| 6,674,967 B2 * | 1/2004 | Skrobko et al. | 398/72 |
| 2004/0190912 A1 * | 9/2004 | Seo et al. | 398/202 |

* cited by examiner

*Primary Examiner* — Hanh Phan

(57) ABSTRACT

Techniques are provided for implementing a burst mode optical receiver capable of maintaining a stable gain profile in response to a burst signal. The optical receiver has a photodiode in balanced circuit configuration with a separate RF amplifier stage connected to each terminal of the photodiode. The two RF amplifier stages are coupled to biasing voltage sources that are inverted in comparison to the terminal connections and that, in some examples, each contain a field effect transistor (FET) that having a gate that is controlled in response to a sensed voltage. The burst mode optical receiver may be used in numerous applications, including optical line terminations (OLTs) in passive optical networks (PONs).

19 Claims, 4 Drawing Sheets

BURST MODE LINEAR OPTICAL RECEIVERS

TECHNICAL FIELD

This disclosure relates to receivers in a passive optical network ("PON"), and particularly to balanced photodiode receivers with RF amplifier stages exhibiting controlled gain burst mode reception.

BACKGROUND

Fiber optic technology has been recognized for its high bandwidth capacity over longer distances, enhanced overall network reliability and service quality. Fiber to the premises ("FTTP") (also fiber to the building "FTTB"), as opposed to fiber to the node ("FTTN") or fiber to the curb ("FTTC") delivery, enables service providers to deliver substantial bandwidth and a wide range of applications directly to business and residential subscribers. For example, FTTP can accommodate the so-called "triple-play" bundle of services, e.g., high-speed Internet access and networking, multiple telephone lines and high-definition and interactive video applications.

However, utilizing FTTP involves equipping each subscriber premises with the ability to receive optical signals and convert them into electrical signals compatible with pre-existing wiring in the premises (e.g., twisted pair and coaxial). For bi-directional communication with the network, the premises should be equipped with the ability to convert outbound electrical signals into optical signals. In some cases, these abilities are implemented using a passive optical network ("PON").

Generally speaking, a PON is a point-to-multipoint fiber to the premises network architecture in which un-powered optical splitters are used to enable a single optical fiber to serve multiple subscriber premises, e.g., 16 subscribers, 32 subscribers, etc. A PON generally includes an optical line termination ("OLT") at the service provider's central office, and a gateway device at each end user location. For example, the premises equipment at each subscriber location may couple to the PON via an optical network unit ("ONU") (or known as an optical network terminal "ONT").

In a typical configuration, a single OLT serves multiple ONU/ONTs through a single fiber connection that is split by an optical fiber into fiber connections for each ONU/ONT. Each ONU/ONT includes a "transceiver module" that generally includes a laser and associated driver circuitry and converts electrical signals outgoing from the subscriber equipment into optical signals for upstream transmission to the OLT. Correspondingly, the transceiver module includes an optical receiver to convert downstream optical signals incoming from the OLT into electrical signals for the subscriber equipment. The OLT includes a "transceiver module" having a transmitter for converting electrical signals in a central office to optical signals broadcast downstream on the fiber connection, using an encryption scheme and addressing the data for particular ONU/ONTs. The receivers of the transceiver module must be capable of receiving upstream signals from the ONU/ONTs and converting them to electrical signals.

There are a number of different implementations of a PON. Data Over Cable Service Interface Specification (DOCSIS) PON, or DPON, implements the DOCSIS service layer interface on existing PON infrastructure. DPON for example may implement the DOCSIS Operations Administration Maintenance and Provisioning (OAMP) functionality on existing EPON equipment, making the OLT look and act like a DOCSIS Cable Modem Termination Systems (CMTS) platform. The DOCSIS standards define such things as the format for the modulated digital RF carriers used for communicating between a CMTS and its associated cable modems, the frequencies and RF power levels for transmissions, and the process for requesting and being granted permission to transmit over the cable network. Radio Frequency PON (RF-PON) or Radio Frequency over Glass (RFOG) or Hybrid-Fiber-Coax PON (HFC-PON) or Cable PON, is a type of passive optical network that transmits RF signals that are now transported over copper (principally over a hybrid fiber and coaxial cable) over PON.

PON transmissions are examples of "burst" transmissions, in which packet data is sent from the OLT to the ONU/ONTs and from the ONU/ONTs to the OLT in bursts of data. Upstream bursts can come from each of the ONU/ONTs and are sent using a multiple access protocol, such as time division multiple access (TDMA). The bursts contain training symbols, preamble, and payload data.

OLTs are examples of burst mode receivers. As each "burst" signal is received from an ONU/ONT, the OLT must quickly synchronize to the clock of the burst signal and then decode the data within the burst. As networks such as Gigabit PONs (GPONs) move to higher throughput, data is compacted and the spacing between bursts is shortened. This means that OLTs must be able to more quickly synchronize with the clock of a received burst signal and decode the corresponding data. Add to this the increasing dynamic range required of OLTs. As the distance between an OLT and the various, corresponding ONU/ONTs may vary, as well as the number of ONU/ONTs per OLT, the OLT must be able to handle a wide range of power levels on received burst signals. Both of these demands, increased network throughput and high dynamic range, constrain burst mode receives design.

Although the OLT operates as a linear, low noise optical receiver, current design implementations are limited in handling signal bursts. At the start of a transmission, the received optical power quickly transitions (few hundred nanoseconds) from an idle power that is near zero to an on state which consists of an average power that is maintained for the duration of the burst plus an RF modulation component. The sudden increase in the received optical power can vary depending on the proximity of the transmitting ONU/ONT, and thus can change from burst to burst as the distance to the OLT can vary from ONU/ONT to ONU/ONT. In conventional systems, the sudden increase results in an overload condition that disrupts the amplifier bias voltages and currents. It is therefore desired to develop optical receiver designs that increase the overload capacity for received burst signals, in particular those receivers used in PON type configurations.

DETAILED DESCRIPTION

The present disclosure describes techniques for implementing burst mode receivers that avoid the detrimental drop in gain experienced by conventional receivers in response to "burst" signals of varying intensities. The receivers discussed below are primarily discussed with reference to an OLT in a PON. However, these techniques may be implemented to improve any suitable burst mode receivers, in particular those having a balanced circuit configuration, with dual amplification stages.

Figure 1:
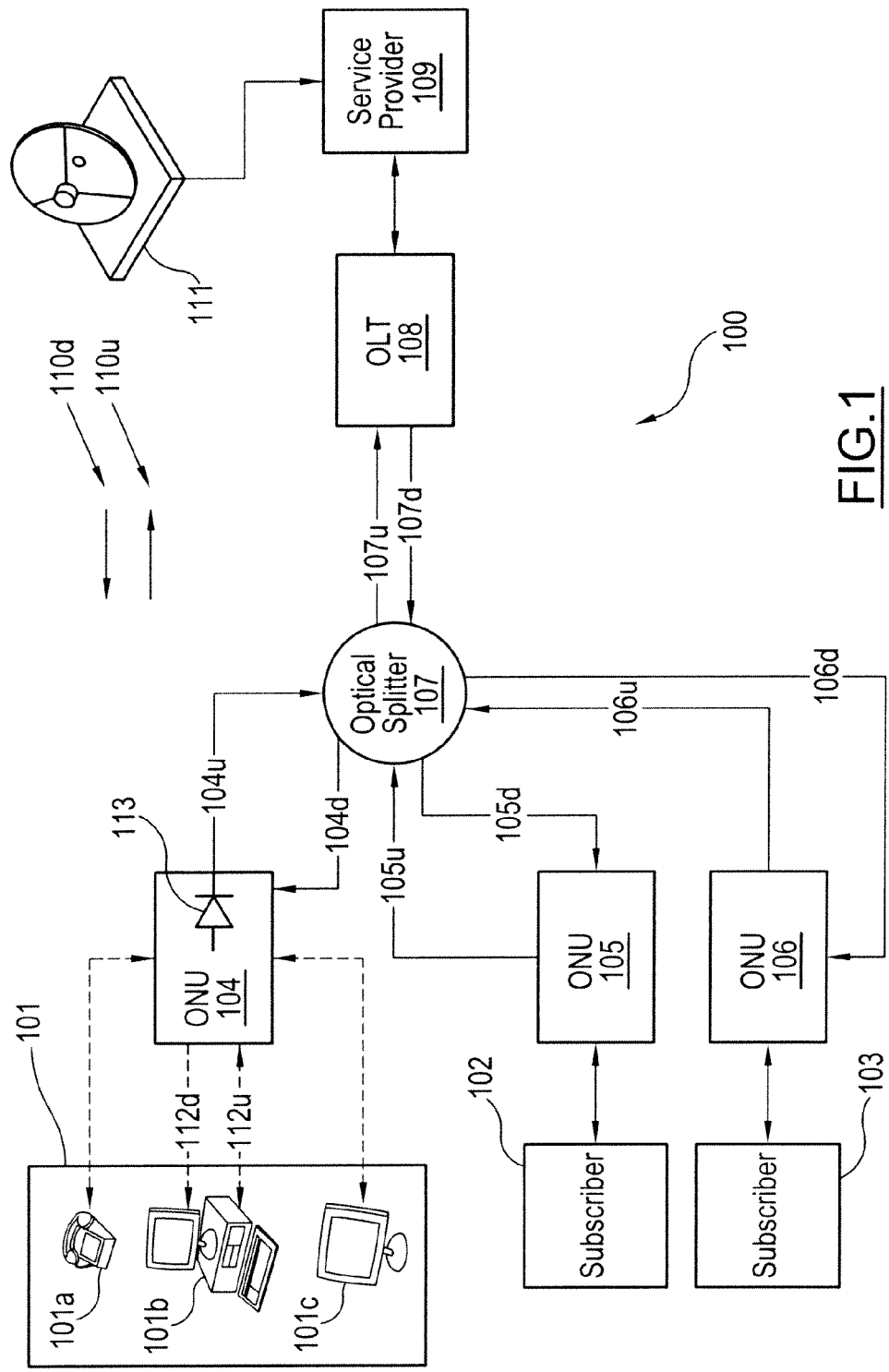
FIG. 1 illustrates a block diagram of an example passive optical network having a optical line terminal with a burst mode receiver in accordance with a present example.

By way of non-limiting example, FIG. 1 illustrates an implementation of a network topology associated with a PON 100. The PON 100 may comprise, in one or more embodiments, a "DPON" that is configured for operation within a cable system according to the Data Over Cable Service Interface Specification ("DOCSIS") or a Radio Frequency PON (RFPON) or Radio Frequency over Glass (RFOG) configuration. The illustration is intended to example a general PON configuration.

With reference to the illustration, data transmission in the direction of arrow 110*d* will be referred to as "downstream" and data transmission in the direction of arrow 110*u* will be referred to as "upstream." Solid lines represent data exchange via an optical link (e.g., one or more fiber optic cables or fibers) and dotted lines represent data exchange via a non-optical link (e.g., one or more copper or other electrically conductive cables). Data transmission via optical links can be bi-directional, even over single fibers. Accordingly, in some implementations, subscribers (e.g., 101-103) receive and transmit data over a single fiber optic cable.

Service provider 109 provides one or more data services to a group of subscribers (e.g., 101-103). In some cases, the data services include, for example, television, telephone (e.g., Voice over IP or "VoIP") and internet connectivity. In some implementations, television services are interactive to accommodate features such as "on-demand" viewing of content. The service provider 109 may generate some or all of the content that the subscribers receive, or it may receive some or all of the content from third parties via a data link. For example, the service provider 109 can be coupled to the PSTN for telephone service, e.g., via E1 or T1 connection(s). In a DPON configuration, for example, the service provider 109 can receive certain television content via head end 111, which also includes a cable modem terminal system (CMTS) for internet/data connectivity. Television content can include additional data that is generated or provided by the service provider 109, e.g., data regarding programming schedules.

The service provider 109, as part of providing data services to a group of subscribers, can be adapted to receive data from those subscribers. For television services, the service provider 109 receives data from subscribers indicative of, e.g., purchases and/or selection of "on-demand" type material or changes to subscription parameters (e.g., adding or deleting certain services). For telephone and internet services, the service provider 109 receives data originating from subscribers, thereby enabling bi-directional communication.

The service provider 109 is adapted to provide the data services content (e.g., bi-directional telephone, television and internet content) via a non-optical link to an optical line termination unit ("OLT") 108. The link between OLT 108 and service provider 109 can include one or more copper or other electrically conductive cables, for example. The OLT 108 is adapted to receive data from the service provider 109 in one format (e.g., electrical) and convert the data to an optical format. The OLT 108 is further adapted to receive data from subscribers (e.g., 101-103) in an optical format and convert it to another format (e.g., electrical) for transmission to the service provider 109. In this implementation, the OLT 108 may be analogized to an electro-optical transceiver that: (1) receives upstream data in an optical format from subscribers (e.g., 107*u*); (2) transmits downstream data in an optical format to subscribers (e.g., 107*d*); (3) transmits the upstream data in electrical format to the service provider 109; and, (4) receives the downstream data from the service provider in an electrical format.

To transmit the various data from the service provider 109 (e.g., telephone, television and internet) on as few optical fibers as possible, the OLT 108 performs multiplexing. In some implementations, the OLT 108 generates two or more optical signals representative of the data from the service provider 109. Each signal has a different wavelength (e.g., 1490 nm for continuous downstream data and 1550 nm for continuous downstream video) and is transmitted along a single fiber. This technique is sometimes referred to as "wavelength division multiplexing."

Also, as certain data from the service provider 109 may be destined for only a particular subscriber (e.g., downstream voice data for a particular subscriber's telephone call, the downstream data for a particular subscriber's internet connection or the particular "on demand" video content requested by a particular subscriber), some implementations of the OLT 108 employ time division multiplexing ("TDM"). TDM allows the service provider 109 to target content delivery to a particular subscriber (e.g., to one or all of 101-103).

The OLT 108 is coupled to an optical splitter 107 via an optical link. The link can include a single optical fiber through which the OLT 108 transmits and receives optical signals (e.g., 107*d* and 107*u*, respectively). The optical splitter 107 splits the incoming optical signal (107*d*) from the OLT 108 into multiple, substantially identical copies of the original incoming optical signal (e.g., 104*d*, 105*d*, 106*d*). Depending on the implementation, each optical splitter 107 splits the incoming optical signal into sixteen or more (e.g., 32 or 64) substantially identical copies. In an implementation that splits the incoming optical signal into sixteen substantially identical copies, there are a maximum of sixteen subscribers. Generally speaking, the number of subscribers associated with a given optical splitter is equal to or less than the number of substantially identical copies of the incoming optical signal.

In a PON implementation, the splitting is done in a passive manner (i.e., no active electronics are associated with the optical splitter 107). Each of the signals from the optical splitter 107 (e.g., 104*d*, 105*d*, 106*d*) is sent to a subscriber (e.g., 101-103, respectively) via an optical link. Also, the optical splitter 107 receives data from subscribers via optical links. The optical splitter 107 combines (e.g., multiplexes) the optical signals (104*u*, 105*u*, 106*u*) from the multiple optical links into a single upstream optical signal (107*u*) that is transmitted to the OLT 108.

In some implementations, each subscriber is equipped with an ONU that employs time division multiple access (TDMA). This allows the service provider 109, with appropriate demultiplexing, to identify the subscriber from whom each packet of data originated. Further, in some implementations, upstream and downstream data between a subscriber (e.g., one of 101-103) and the optical splitter 107 is transmitted bi-directionally over a single fiber optic cable.

The optical splitter 107 typically is disposed in a location remote from the service provider. For example, in a PON implemented for subscribers in a residential area, a given neighborhood will have an associated optical splitter 107 that is coupled, via the OLT 108, to the service provider 109. In a given PON, there can be many optical splitters 107, each coupled to an OLT 108 via an optical link. Multiple optical splitters 107 can be coupled to a single OLT 108. Some implementations employ more than one OLT and/or service provider.

The optical splitter 107 provides the substantially identical downstream signals (104d, 105d, 106d) to optical network units (104, 105, 106, respectively) associated with subscribers (101, 102, 103, respectively). In some implementations, each respective PON module is disposed in the vicinity of the subscriber's location. For example, an ONU may be disposed outside a subscriber's home (e.g., near other utility connections). In the context of the network architecture, each ONU operates in a substantially identical fashion. Accordingly, only the functionality of ONU 104 will be discussed in detail.

ONU 104 receives the downstream signal 104d and demultiplexes the signal into its constituent optical signals. These constituent optical signals are converted to corresponding electrical signals (according to a protocol) and transmitted via electrical links to the appropriate hardware. In some implementations, electrical signals are generated that correspond to telephone (VoIP), data/internet and television service. For example, electrical signals corresponding to telephone service are coupled to traditional telephone wiring at the subscriber's location, which ultimately connects with the subscriber's phone 101a. Television signals (e.g., for a cable-compatible television 101c) are converted to appropriate RF signals and transmitted on coaxial cable installed at a subscriber's location. Data/internet services (e.g., for a personal computer (PC) 101b and associated cable modem) also may be provided via coaxial cable. Downstream data signal 112d comprises data transmitted to PC 101b. Upstream data signal 112u comprises an RF signal transmitted by PC 101b.

As telephone, internet/data and television services all can be bidirectional, the ONU receives electrical signals that correspond to data originating from the subscriber location (e.g., upstream data signal 112u). This upstream data is converted to an optical signal 104u by the laser 113 (which can be part of the transceiver module within the ONU 104) and transmitted to the optical splitter 107. The optical splitter 107 combines optical signal 104u with the optical signals from other ONUs (e.g., 105u and 106u) for transmission to the OLT 108 (as signal 107u).

Using the PON 100 in a DPON embodiment, the PON 100 interfaces a number of cable modems or other subscriber equipment to cable head end equipment, e.g., a CMTS. In such implementations, downstream electrical signals are transmitted from the CMTS and targeted to one or more subscribers. The OLT 108 converts these downstream signals into optical signals for transmission over the PON 100 to the subscriber(s). Correspondingly, ONUs at the subscriber locations convert the downstream optical signals back into electrical signals for coupling into subscriber equipment. In complementary fashion, the ONU at a given subscriber location converts upstream electrical signals into optical signals for transmission over the PON 100. The OLT 108 converts these upstream optical signals back into electrical signals for coupling into the CMTS.

Figure 2:
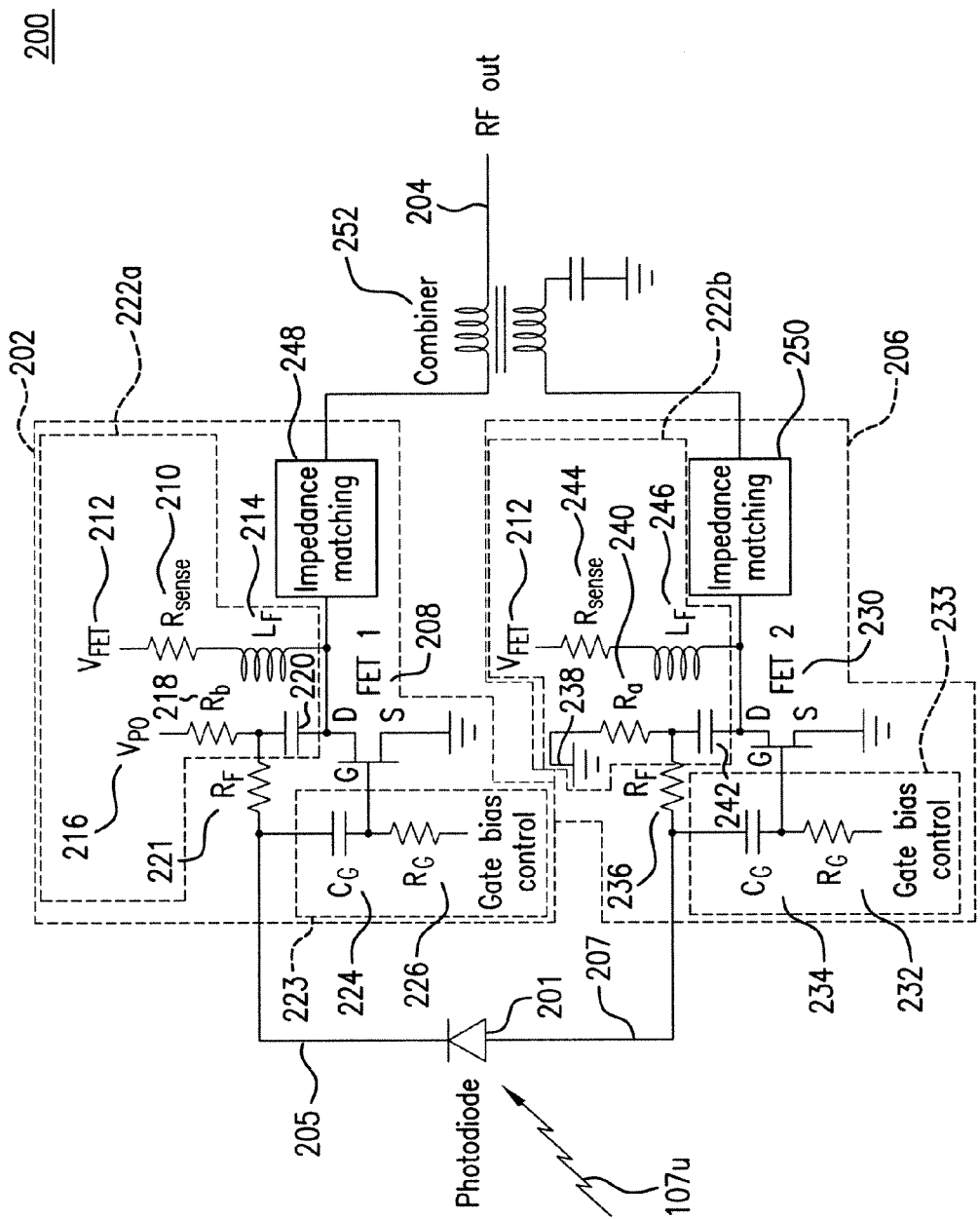
FIG. 2 illustrates an example circuit diagram of a front end portion of the burst mode receiver of FIG. 1, in accordance with a present example.

The OLT 108 may be implemented as having a gain stage front end as shown in a partial illustration of an optical receiver 200, in FIG. 2. The optical receiver 200 may be used in a PON to receive data-carrying, optical signals from any of the plurality of ONUs 104-106 and convert those optical signals into corresponding electrical signals. In operation, the upstream optical signal 107u is received at a photodiode 201. In the illustrated example, the receiver 200 is in a balanced configuration where a first RF amplification stage 202 is connected to a first terminal 205 (e.g., cathode) of the photodiode 201; and a second RF amplification stage 206 is connected to a second terminal 207 (e.g., anode) of the photodiode 201. The photodiode 201 is preferably operating as a linear photodiode producing two output signals each coupled to nominally identical RF amplification stages 202 and 206, which provide signal gain and impedance matching with an RF output channel 204 coupled thereto.

The RF amplification stage 202 includes a field-effect transistor (FET) 208 that during steady state operation has a drain current controlled by monitoring the voltage drop across a sense resistor 210, $R_{sense}$, coupled at one node to the reference voltage 212, $V_{FET}$, of the receiver 200, and at the other node to a biasing inductor 214, Lf. The FET 208 has a source connected to ground and drain coupled to a node of the inductor 214. The drain is also coupled to a positive side biasing circuit containing bias voltage 216, $V_{PO}$, resistor ($R_b$) 218, and capacitor 220, connected to the terminal 205 through a resistor ($R_F$) 221. The gate of the FET 208 is connected to a gate capacitor ($C_G$) 224 and a resistor ($R_G$) 226. The resistor 226 receives a gate bias control signal which is generated by a controller (not shown) in response to the voltage measured across the sense resistor 210. The gate capacitor 224, gate resistor 226 and controller form a first gate bias control circuit 223 that supplies an adjustable control voltage signal for controlling operation of the FET 208 in response to receipt of a burst signal. The gate capacitor 224 is connected directly between the cathode terminal 205 and the gate of the FET 208, and is set to a relatively low value so as to create a relatively fast RC time constant with the gate resistor 226. The elements 210, 212, 214, 216, 218, and 220 form a first portion of a biasing circuit 222a.

Turning to the terminal 207, the RF amplifier stage 206, which can be identical to the RF amplifier stage 202, includes a FET 230 and a gate resistor 232 and gate capacitor 234 (forming part of a second gate bias control circuit 233) both coupled to the gate of the FET 230 and forming a second bias where the later is coupled to the terminal 207 as well. A resistor 236 couples the node 207 to a negative side portion of the biasing circuit 222 containing ground connection 238, resistor 240, and capacitor 242, the later coupled to the drain of the FET 230. The source of the FET 230 is coupled to ground. A gate control bias signal is supplied based on a voltage sensed across sense resistor 244 coupled between the reference voltage 212 (illustrated as $V_{FET}$ the same reference voltage value from the RF amplifier 202) and an inductor 246. The elements 212, 238, 240, 242, 244, and 246 form a second portion of a biasing circuit 222b.

Each of the RF amplifiers 202 and 206 includes an impedance matching circuit 248 and 250, respectively, for matching the impedance of the FETs 208 and 230 with a combiner 252 that produces the RF output signal on line 204 from the amplified output signals from each stage 202 and 206. The elements 210, 212, 214, 216, 218, and 220 form a first portion of a biasing circuit 222a.

In operation, at the beginning of an optical burst from an ONU (or ONT), the voltage on the gate of FET 208 is driven low and the voltage on the gate of the FET 230 is driven high. This result alters the drain currents and voltages of these two FETs. The FET 208 has a transient drop in current, and the FET 230 has a transient rise in current. In conventional systems there was a threat this transient change in bias would be too great, and the receiver would exhibit overload behavior in which the gain of the receiver will be significantly reduced until the bias control circuitry was able to restore the desired operating point.

In a conventional configuration, the gate capacitance $C_G$ would be chosen so that the impedance of the capacitor is low compared to the impedance of the receiver, which is typically rated at 50 or 75 ohms over the operating frequency range. The FET bias inductors 214 and 244 are typically chosen so that the impedance of these inductors is large compared to that receiver impedance over the operating frequency range. Conventionally, the biasing inductor is not to be larger than the minimum impedance required to exceed the receiver impedance, as using an inductor of larger impedance would add cost and increase the parasitic capacitance of the biasing inductor, which in turn can reduce the receiver bandwidth.

Figure 3:
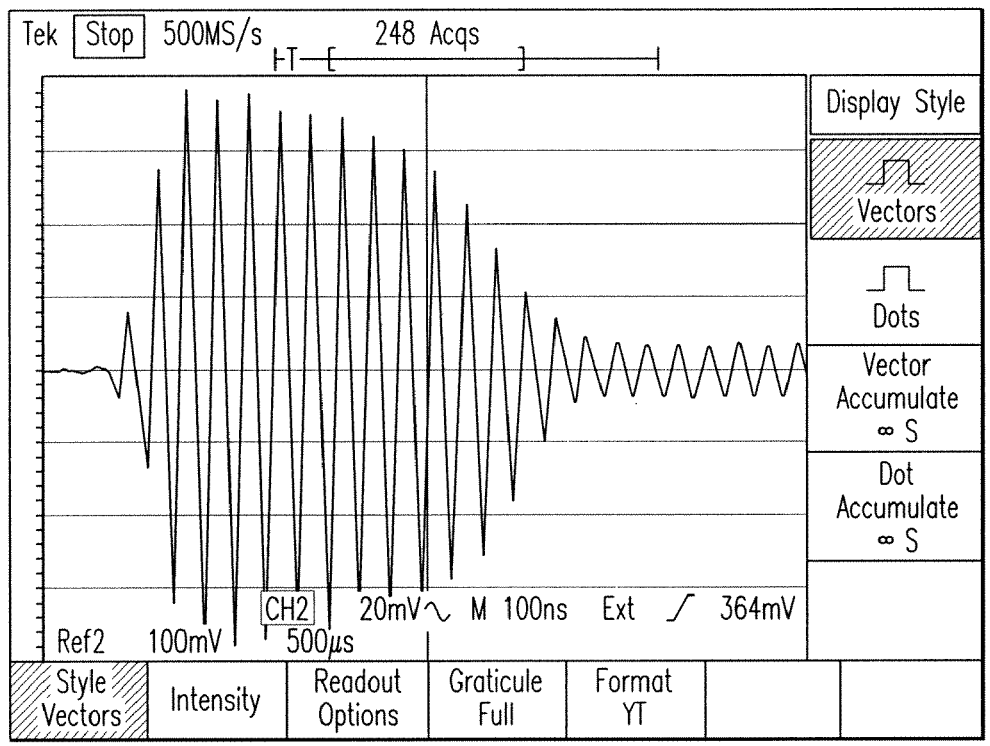
FIG. 3 illustrates a plot of receiver gain versus time for a conventional optical receiver, showing a substantial drop in gain, where that drop remains low for over 10 µs.

FIG. 3 shows an example of a burst mode overload condition for an optical receiver following these conventional impedance settings for the gate capacitor and biasing inductor. In the illustrated example, the received optical power during the burst is −10 dBm. In the steady state, the receiver will operate in a very linear fashion at −10 dBm. However, at the start of the burst, the gain drops severely, as shown. Although not fully shown in FIG. 3, the gain remains low for more than 10 μs before slowly recovering.

In order to minimize this transient burst mode overload, the electrical component values are set significantly differently from that which would customarily be used. For example, for a receiver within a minimum operating frequency of 5 MHz, a conventional value for the gate capacitance value would be 10,000 pF, which corresponds to capacitor impedance of 3 ohms at 5 MHz, well below the receiver impedance rating of 50 to 75 ohms. The receiver 200, by comparison, has been optimized for burst mode operation, by setting the gate capacitors 226 and 234 to capacitance values in the range of 10 to 100 pF, for the same receiver minimum operating frequency (approx. 5 MHz). Using a lower capacitance reduces the RC time constant for the gate bias on the FETs 208 and 230, thereby reducing the recovery time for controlling the gates of these RF amplifiers. The time constant can also be reduced by lowering the resistance of the gate resistors 226 and 232, although this could add thermal noise and may be considered a less desirable approach.

The FET biasing inductors for a 5 MHz minimum operating frequency would conventionally be in the range of 5 μH, which corresponds to an inductor impedance of about 150 ohms at 5 MHz, well above the receiver impedance rating of 50 to 75 ohms. It was discovered that increasing the value of this inductance will slow down the transient change in the bias current supplied to the FETs 208 and 230, which helps prevent overload by allowing more time for the gate bias control to recover the FET bias current. In a burst mode optimized receiver, the biasing inductors 214 and 244 may thus be chosen to be a factor of 10 or more higher than the customary value, i.e., 50 to 100 μH.

Figure 4:
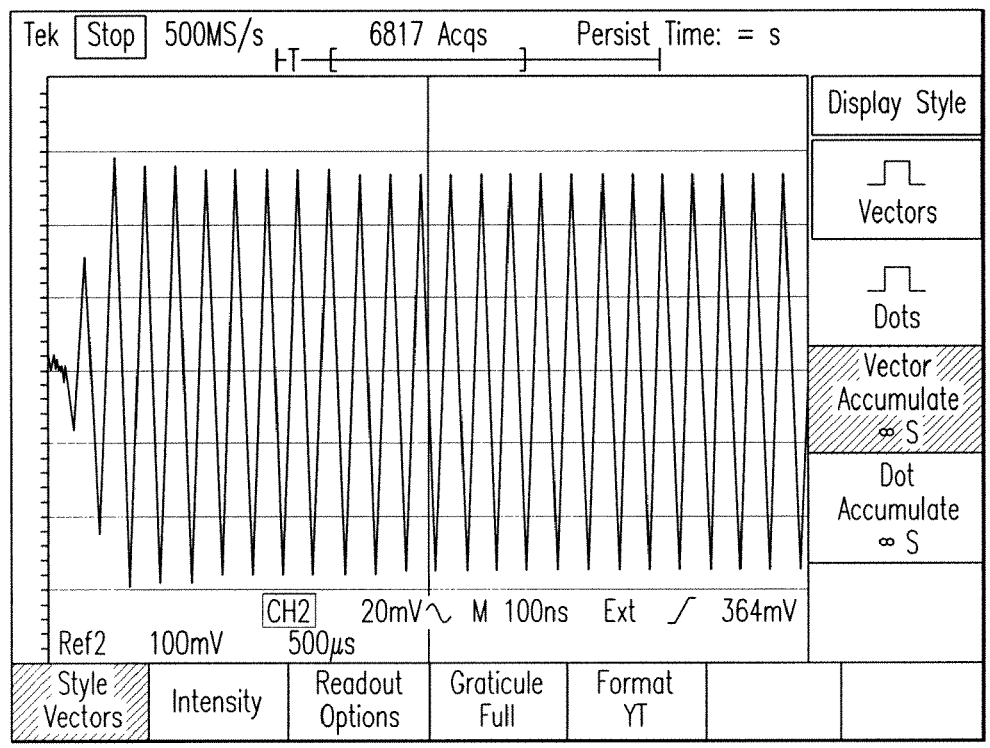
FIG. 4 illustrates a plot of receiver gain versus time for an optical receiver optimized for burst mode operation, and showing a much smaller drop in gain compared to that of FIG. 3, and where that drop remains low for approximately 2 µs.

By comparison to FIG. 3, FIG. 4 shows the burst mode performance at −10 dBm of the receiver 200 optimized for burst mode operation. In the illustrated example, there is almost no decrease in gain at the start of the burst and the gain fully recovers to the steady state level within 2 μs. Note that in both cases the rise in the gain at the start of the burst is due to the burst mode transmitter characteristics.

Figure 5:
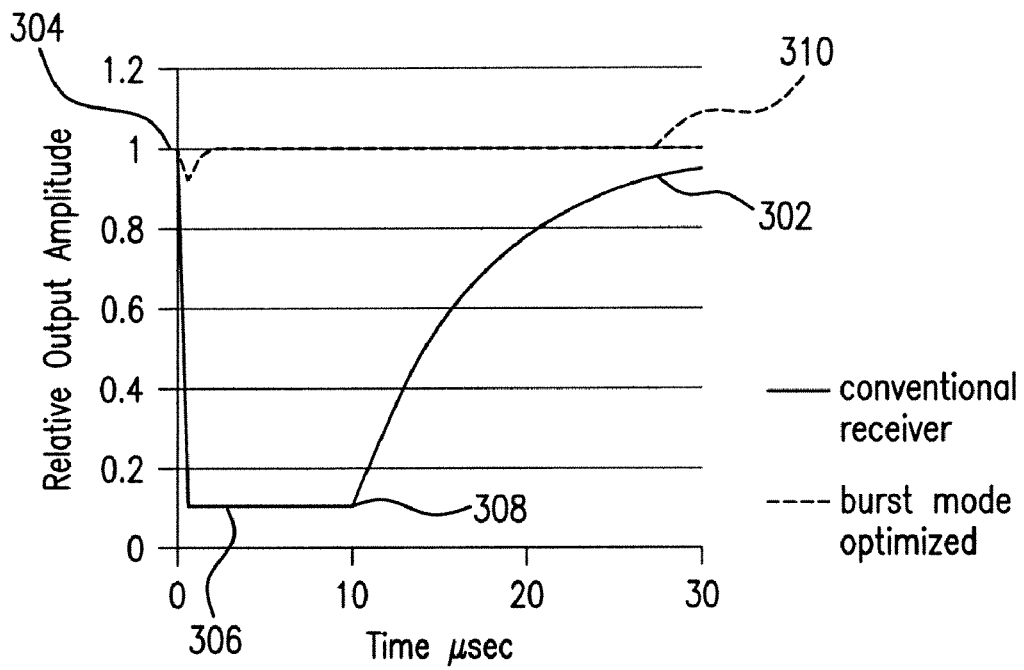
FIG. 5 illustrates a plot of RF gain versus time for a conventional optical receiver and a burst mode optimized receiver in accordance with an example.

FIG. 5 illustrates a plot of relative RF gain for an optical receiver plotted against time, for a burst signal condition. A first curve 302 plots the performance of a conventional receiver and shows a dramatic drop in relative RF gain from a steady state value 304 to a minimum value 306. This dramatic drop in gain results from the overload condition described above, and shows that the gain drops dramatically and to the overload value of 306, where the receiver gain stays until the gate bias control can eventually recover from the drop and begin restoring the RF gain at a time 308, which is approximately 10 μs in the illustrated example. The curve 302 therefore as these two knees, one where the gain drop is so dramatic as to clip under the overload condition, and another as the gate bias control begins to ramp up the gain after a substantially long recovery window of 10 μs. The steady state gain value of 304 is not reached for more than another 20 μs in the conventional receiver.

The curve 310 from the optimized burst receiver, however, exhibits a very small drop in RF gain, for example, an approximate 10% drop compared to the approximate 90% drop for the conventional case. Furthermore, the optimized burst receiver is able to quickly recover from that drop by the having a reduced RC constant for the gate bias control, for example, where the steady state value of 304 is reached within approximately 2 μs, not over 30 μs, as with the conventional system.

Figure 6:
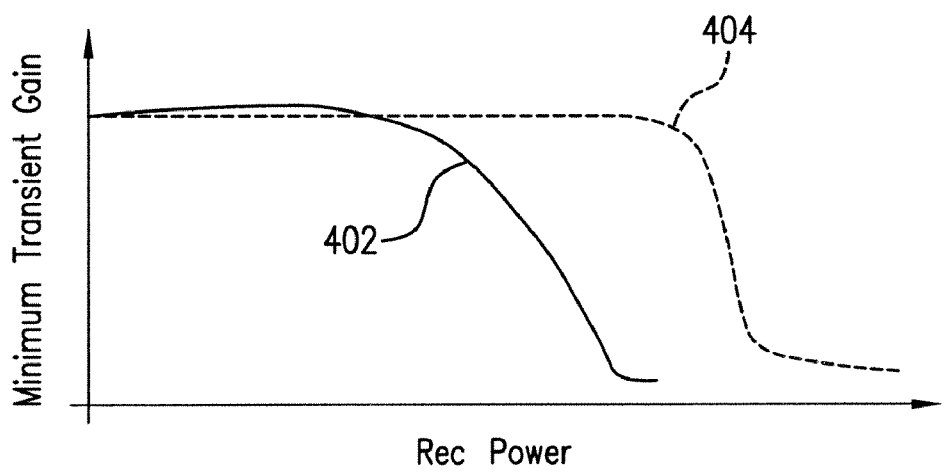
FIG. 6 illustrates a plot of minimum transient gain versus received optical power for a conventional optical receiver and a burst mode optimized receiver in accordance with an example.

FIG. 6 is another characterization of example burst mode improvement of the receiver 200. FIG. 6 illustrates the dependence of the minimum transient gain on the received optical power. A first curve 402 shows the gain response for a conventional receiver, while curve 404 shows the gain response for a receiver optimized for burst mode operation. The optimized receiver has a larger gain bandwidth able to maintain stable gain responsiveness over a larger range of power levels (e.g., in dB) on the received burst signal.

Embodiments of the subject matter and the functional operations described in this specification can be implemented in analog or digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed:

1. An optical receiver comprising:
    a photodetector to receive from an external optical fiber an information containing optical communications signal transmitted in time spaced signal bursts and converting such signal bursts into an electrical signal;
    a first RF amplifier coupled to a first electrical output of the photodetector for generating a first output signal;
    a second RF amplifier coupled to a second electrical output of the photodetector for generating a second output signal;
    a capacitor having a capacitance of less than 200 pf and coupling the first electrical output to the first RF amplifier;
    a biasing circuit connected to said first and second RF amplifiers for reverse biasing the photodetector;
    a combiner circuit coupled to the output of the first and second RF amplifiers for producing an RF output signal; and
    a gate control that is coupled to supply a gate bias control signal to the first RF amplifier,
    wherein the gain of each of the first RF amplifier and the second RF amplifier is maintained at substantially the same level from approximately the beginning of a signal burst and continuing for a period of at least 100 microseconds after the beginning of the burst.

2. The optical receiver of claim 1, wherein the biasing circuit comprises a positive voltage bias source coupled to the first RF amplifier, the first RF amplifier being coupled to a cathode of the photodetector, wherein the positive voltage bias is coupled to a drain of a first field effect transistor (FET) within the first RF amplifier.

3. The optical receiver of claim 2, wherein the biasing circuit comprises a negative voltage bias source or ground voltage source coupled to the second RF amplifier, the second RF amplifier being coupled to an anode of the photodetector, wherein the negative voltage bias source or ground voltage source is coupled to a drain of a second FET within the second RF amplifier.

4. The optical receiver of claim 3, wherein the biasing circuit further comprises a reference voltage source and sensing resistor pair each coupled to the first RF amplifier and to the second RF amplifier, respectively, such that a voltage across the sensing resistors indicates a voltage level of the first output signal and the second output signal, respectively.

5. The optical receiver of claim 2, further comprising:
    a first biasing inductor coupling the positive voltage bias source to the first FET; and
    a second biasing inductor coupling the negative voltage bias source or ground voltage source to the second FET.

6. The optical receiver of claim 5, wherein the first biasing inductor and the second biasing inductor have inductances of 20 µH or above.

7. The optical receiver of claim 1, further comprising another capacitor having a capacitance of less than 200 pf and coupling the second electrical output to the second RF amplifier.

8. The optical receiver of claim 1, further comprising an impedance matching circuit for matching the impedance of the first RF amplifier and the second RF amplifier with that of the combiner.

9. The optical receiver of claim 1, wherein the first RF amplifier is coupled to a cathode of the photodetector.

10. The optical receiver of claim 1, wherein the first RF amplifier is coupled to an anode of the photodetector.

11. A burst mode optical receiver for receiving an information containing optical communications signal transmitted in time spaced signal bursts and converting such signal bursts into an electrical signal comprising:
    a photodetector having a positive terminal and a negative terminal;
    a first RF amplifier having a low voltage biasing source and coupled to the positive terminal for generating a first output signal;
    a second RF amplifier having a high voltage biasing source and coupled to the negative terminal for generating a second output signal; and a gate bias control circuit coupled to the first RF amplifier and the second RF amplifier, wherein the gate bias control circuit controls gain of each of the first and second RF amplifiers and is configured to, in response to a sensed voltage, maintain gain of the first RF amplifier and the second RF amplifier in response to a signal burst for a period of at least 100 microseconds after the beginning of the signal burst.

12. The burst mode optical receiver of claim 11, wherein the first RF amplifier comprises a first field effect transistor (FET) and wherein the second RF amplifier comprises a second FET.

13. The burst mode optical receiver of claim 12, wherein the gate bias control circuit comprises a first gate capacitor coupling the negative terminal to a gate of the second FET, wherein the first gate capacitor has a capacitance of less than 200 pf.

14. The burst mode optical receiver of claim 13, wherein the gate bias control circuit comprises a second gate capacitor coupling the positive terminal to a gate of the first FET, wherein the second gate capacitor has a capacitance of less than 200 pf.

15. The burst mode optical receiver of claim 12, further comprising
a first biasing inductor coupling the low voltage biasing source to the first FET; and
a second biasing inductor coupling the high voltage biasing source to the second FET.

16. The burst mode optical receiver of claim 11, wherein the gate bias control circuit is configured to maintain the gain of the first RF amplifier and the gain of the second RF amplifier within 20% of an steady state gain in response to a signal burst.

17. The burst mode optical receiver of claim 16, wherein the gate bias control circuit is configured to reach a steady state gain for the first RF amplifier and for the second RF amplifier in less than 5 μs.

18. An optical receiver comprising:
a photodetector to receive from an external optical fiber an information containing optical communications signal transmitted in time spaced signal bursts and converting such signal bursts into an electrical signal;
a first RF amplifier coupled to a first electrical output of the photodetector for generating a first output signal, wherein the first RF amplifier comprises a first field effect transistor (FET);
a second RF amplifier coupled to a second electrical output of the photodetector for generating a second output signal;
a capacitor having a capacitance of less than 200 pf and coupling the first electrical output to the first RF amplifier, wherein the capacitor is coupled to a gate of the first FET;
a biasing circuit connected to said first and second RF amplifiers for reverse biasing the photodetector;
a combiner circuit coupled to the output of the first and second RF amplifiers for producing an RF output signal, and
a gate control that is coupled to supply a gate bias control signal to the gate of the first FET,
wherein the gain of each of the first RF amplifier and the second RF amplifier is maintained at substantially the same level from approximately the beginning of a signal burst ad continuing for a period of at least 100 microseconds after the beginning of the burst.

19. The optical receiver of claim 18, wherein the second RF amplifier comprises a second FET and wherein the capacitor is coupled to a gate of the second FET, and wherein the gate control is coupled to supply a gate bias control signal to the gate of the second FET.

* * * * *